3,357,947
BISPHENOL COMPOUND HAVING
ANTIOXIDANT PROPERTIES
Hans H. Stockmann, Plainfield, N.J., and Horace W. Blakeslee, Jr., Havertown, Pa., assignors to FMC Corporation, Philadelphia, Pa., a corporation of Delaware
No Drawing. Filed July 15, 1964, Ser. No. 382,934
3 Claims. (Cl. 260—45.95)

ABSTRACT OF THE DISCLOSURE

A resinous polymer of an alpha-mono-olefin containing an anti-oxidant amount of bis(5-tertiary-butyl-6-hydroxy-meta-tolyl)cyclooctane is disclosed herein.

It is an object of this invention to provide a novel bisphenol compound.

It is another object of this invention to provide an inexpensively prepared, novel bisphenol compound having improved antioxidant properties in certain resins.

It is still another object of this invention to provide a polyolefin composition containing an oxidation stabilizing, novel bisphenol compound.

These and other objects are accomplished in accordance with this invention which comprises bis(5-tertiary-butyl-6-hydroxy-meta-tolyl) cyclooctane. The invention also includes a composition comprising an olefin polymer and an oxidation stabilizing amount of the above bis(butylhydroxytolyl) cyclooctane.

The compound of the invention is formed in brief by reacting ortho-tertiary-butyl-para-cresol with cyclooctadiene under Friedel-Crafts conditions.

The olefin polymers for the compositions of this invention are preferably formed from alpha-olefins having from 2 to 8 carbon atoms. Examples of these include ethylene, propylene, butylene, isobutylene, amylene, isoamylene, hexylene, heptylene and octylene. Olefinic copolymers such as ethylene-propylene and ethylene-isobutylene are also included as useful polymers for the compositions of this invention. On the basis of availability and economics, polymers of ethylene, propylene and isobutylene are preferred.

An example of the preparation of the novel bisphenol compound of this invention is as follows:

Example

To prepare ortho-tertiary-butyl-para-cresol, a small amount of boron trifluoride was bubbled through 100 ml. 85% phosphoric acid. 125 gm. of para-cresol was added to this, and the mixture was heated to 60° C. with stirring. 100 ml. tertiary-butanol was added slowly and the mixture stirred for 5 hours. On cooling to room temperature, crystals separate which were filtered and washed with aqueous sodium bicarbonate and water to give the above compound.

30 gm. of o-t-butyl-p-cresol was melted in a flask and boron trifluoride bubbled through until the solution turned dark red. It was then heated to 70° C. with stirring and 15 gm. 1,5-cyclooctadiene added slowly. Stirring was continued for 3 hours, after which the solution was allowed to cool. It was then poured into an excess of ether and extracted with sodium carbonate solution once and water once. The ether solution was then stripped to 200° C. at 0.3 mm. pressure leaving a light colored residue which could be ground to a powder after cooling.

Analytical testing indicated that the bis(5-t-butyl-6-hydroxy-m-tolyl) cyclooctane had been formed.

The structural formula for the new compound is as follows:

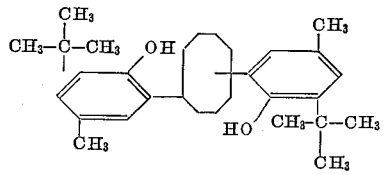

The above compound was tested as an oxidation inhibitor in polypropylene resin and found to be almost as effective as the mostly costly commercially available stabilizer. Thus, this compound has been found to be an excellent, low cost antioxidant for polyolefin resins. The amount of this antioxidant used in the polyolefin resin ranges from 0.01 up to 5% and preferably from 0.01 to 1% based on the weight of the inhibited polymer.

The new compound of this invention may also be used as an antioxidant for lubricating compositions and similar substances.

Various changes and modifications may be made practicing the invention without departing from the spirit and scope thereof and, therefore, the invention is not to be limited except as defined in the appended claims.

We claim:

1. A composition comprising a resinous polymer of an alpha-mono-olefin having from 2 to 8 carbon atoms and an anti-oxidant amount of a compound having the following structural formula:

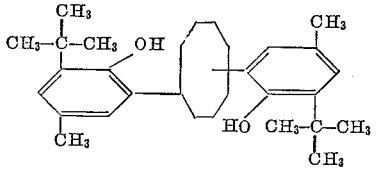

said compound having been formed by the reaction of ortho-tertiary-butyl-para-cresol with cyclo-octadiene.

2. The composition of claim 1 wherein the anti-oxidant amount ranges from 0.001 to 5%, based on the weight of the polymer.

3. The composition of claim 1 wherein the resinous polymer is a polymer of ethylene, propylene, isobutylene or mixtures of these monomers and the anti-oxidant amount ranges from 0.01 to 1%, based on the weight of the polymer.

References Cited

UNITED STATES PATENTS

| | | | |
|---|---|---|---|
| 2,883,364 | 4/1959 | Mathes | 260—45.95 |
| 2,883,365 | 4/1959 | Mathes | 260—45.95 |
| 2,894,004 | 7/1959 | Dietzler | 260—45.95 |
| 2,985,617 | 5/1961 | Salyer et al. | 260—45.95 |

DONALD E. CZAJA, Primary Examiner.

H. E. TAYLOR, JR., Assistant Examiner.